(12) United States Patent
Sato (10) Patent No.: US 6,196,485 B1
(45) Date of Patent: Mar. 6, 2001

(54) DUAL-BEARING REEL CENTRIFUGAL BRAKING DEVICE

(75) Inventor: Jun Sato, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 09/593,479

(22) Filed: Jun. 14, 2000

(30) Foreign Application Priority Data

Jun. 16, 1999 (JP) .................................................. 11-169393

(51) Int. Cl.$^7$ .................................................. A01K 89/02
(52) U.S. Cl. ........................ 242/289; 188/184; 188/187
(58) Field of Search .................................. 242/289, 301, 242/302, 303; 188/187, 184, 180

(56) References Cited

U.S. PATENT DOCUMENTS

| | | | |
|---|---|---|---|
| 4,195,721 | * 4/1980 | Shea | 188/184 |
| 5,308,021 | * 5/1994 | Ikuta | 242/289 |
| 5,950,949 | * 9/1999 | Cockerham | 242/289 |
| 5,984,221 | * 11/1999 | Kim | 242/289 |
| 5,996,921 | * 12/1999 | Hogaki et al. | 242/289 |
| 6,003,798 | * 12/1999 | Kim | 242/289 |
| 6,086,005 | * 7/2000 | Kobayashi et al. | 242/289 |

FOREIGN PATENT DOCUMENTS

| | | |
|---|---|---|
| 11-075643 | 3/1999 | (JP) . |
| 11-299402 | 11/1999 | (JP) . |

* cited by examiner

*Primary Examiner*—Emmanuel M. Marcelo
(74) *Attorney, Agent, or Firm*—Shinjyu Intellectual Property Firm

(57) ABSTRACT

A centrifugal braking mechanism of a dual-bearing reel for braking under centrifugal force the reel spool fitted rotatively in the body of the reel. The centrifugal braking mechanism achieves simple adjustment of braking force, by which adjustment distinctly perceptible differences in braking force are gained. The centrifugal braking mechanism includes shifting members (52), a brake element (53), an urging member (54), a restricting member (55), and an urging force adjusting mechanism (56). The shifting members are provided on a rotary member (51) that rotates with the spool, and are shifted under centrifugal force arising from rotation of the spool. The brake element is non-rotatably provided on, and permitted to shift axially with respect to, the reel body. The brake element comes into contact with the shifting members shifted under centrifugal force. The urging member urges the brake element towards the shifting members, which movement is controlled by the restricting member. The urging force adjusting mechanism adjusts the urging force of the urging member.

9 Claims, 9 Drawing Sheets

DUAL-BEARING REEL CENTRIFUGAL BRAKING DEVICE

BACKGROUND OF THE INVENTION

1. Technical Field

The present invention relates to reel-braking devices; in particular to dual-bearing reel centrifugal braking devices for braking the spool rotatively provided in the reel body.

2. Description of Related Art

In dual-bearing reels referred to as a bait reels, utilized mainly for lure fishing, generally braking force is made to act on the spool so that backlash, wherein the rotational speed of the spool when casting is faster than the line wind-out speed, does not occur. Centrifugal braking devices that employ centrifugal force developing from spool rotation to brake the spool are an example of this type of braking mechanism.

Centrifugal braking devices of this class are in general provided with: a plurality of shifting members fitted to permit radial shifting at circumferentially spaced intervals on the spool, or on a rotary member that rotates linked with the spool; and a cylindrical brake element fixed to the body of the reel, disposed at the outer peripheral ends of the shifting members, enabling contact with the shifting members.

In this centrifugal braking device, when the spool rotates, the shifting members travel radially outward under centrifugal force and contact on the braking surface to brake the spool. Since the centrifugal force increases in proportion to the square of the rotational speed of the spool, the spool rotating at low speeds when reeling-in line does not make the braking force very large; the spool rotating at high speeds when casting does make it large. Therefore, the centrifugal braking device characteristically has small resistance while line is reeled in, and large braking force with which backlash is prevented when casting.

In these centrifugal braking devices, the number of shifting members that travel radially is varied in order to adjust the braking force. Each of the shifting members therefore is provided with a lock mechanism that switches the shifting members into an operating position in which they can come into contact with the brake element, and into a non-operating position in which they cannot make contact.

When lure fishing, for instance, with a bait reel having this type of centrifugal braking device, wherein lures of different weights such as plugs and worms are used, if the braking force is constant the flight distance when casting fluctuates depending on the lure weight. Thus, adjusting the braking force according to weight is desirable wherein lures of differing weights are used.

With the conventional centrifugal braking devices noted above, since the shifting members travel radially, in the same direction as the centrifugal force acts, large braking forces are gained. Nevertheless, the braking force has to be adjusted by increasing/decreasing the number of shifting members that can contact the brake element by means of the lock mechanisms with which the shifting members are equipped. Instances therefore arise in which to adjust the braking force it is necessary to operate a number of the lock mechanisms, which complicates braking force adjustment.

Therein, Japanese Laid-Open Pat. App. No. 10-304798 discloses a centrifugal braking device in which braking force adjustment can be single-operation-regulated by a dial exposed on the exterior of the body of the reel.

The centrifugal braking device is provided with: a rotary member that rotates linked with the spool; a plurality of shifting members disposed radially on the rotary member and fitted to permit pivoting on the rotary member; a brake element provided on the body of the reel to allow it reciprocating travel in the spool axle direction to enable it to abut on the tips of the shifting members; and a shifting mechanism having a dial that is turned to reciprocatingly shift the brake element. Contact portions are provided on the tips of the shifting members for contact with the brake element. A ring-shaped brake shoe that comes into contact with the contact portions is provided on the side face of the outer circumferential side of the brake element, which is a disk-shaped member. Turning the dial on the shifting mechanism shift s the brake element reciprocatingly in the spool axle direction.

When the spool rotates in the above-noted conventional centrifugal braking device, centrifugal force acts on the shifting members, which pivots the shifting members turning outward in the spool axial direction. They then come into contact with the brake shoe, which brakes the spool. Braking force can be single-operation adjusted by turning the dial to shift the brake element in the spool axle direction, which changes the pivoting angle of the shifting members when they contact the brake shoe.

With the above-noted conventional centrifugal braking device, braking force adjustment is simply carried out by turning the dial. Nevertheless, large braking forces are hard to gain, since the braking force obtained by contact with the brake shoe is gained depending on the force from the shifting members pivoting axially outward.

This is because it is difficult efficiently to retrieve as a braking force radially acting centrifugal force, since the shifting members pivot axially outward, and do not travel in the radial outward direction. What is more, since braking force is adjusted by varying the pivoting angle of the shifting members, the change in braking force when the brake element is shifted in the spool axle direction is small; a distinct change in braking force can hardly be sensed.

SUMMARY OF THE INVENTION

An object of the present invention is in a centrifugal braking device for a dual-bearing reel to make braking force adjustment simple, and moreover to enable a distinct difference in braking force to be gained by the adjustment.

The centrifugal braking device for a dual-bearing reel according to a first aspect of the present invention is a device for braking a spool which is rotatably adapted to a reel body by using centrifugal force and includes shifting members, a brake element, a first urging member, a restricting member, and an urging force adjusting mechanism. The shifting members are provided on the spool or a rotary member which rotates together with the spool. The shifting members are moved by centrifugal force generated by a rotation of the spool. The brake element is non-rotatably provided on the reel body in a movable manner in an axial direction of the spool. The brake element is capable of making contact with the shifting members that are moved by the centrifugal force. The first urging member urges the brake element in a direction towards the shifting member side. The restricting member restricts a movement of the brake element in a direction towards the shifting member side. The urging force adjusting mechanism is a mechanism for adjusting an urging force of the first urging member.

In this centrifugal braking device, when the spool rotates, the shifting members are moved towards the brake element side by the centrifugal force to make contact with the brake element and press the brake element. Since the brake element is non-rotatably provided on the reel body, the spool is braked by the friction between the shifting members and the brake element. The brake element is urged towards the shifting member side by he first urging member. Accordingly, when the urging force of the first urging member is adjusted, the frictional force changes since the reaction force generated when the shifting members push the brake element changes, and the braking force varies in proportion to the frictional force. In this case, since the braking force is adjusted by changing the urging force of the first urging member, the braking force may be easily adjusted and a distinctive difference in the braking force may be obtained by the adjustment of the urging force.

The centrifugal braking device for a dual-bearing reel in a second aspect is a device according to the invention in its first aspect, but further including a second urging member for urging the brake element in a direction away from the shifting members. The urging force of the second urging member is weaker than the urging force of the first urging member. In this case, when it is desired to brake the spool, the urging force of the first urging member is adjusted by using the urging force adjusting mechanism so that it becomes stronger than the urging force of the second urging member. Also, if it is desired to freely rotate the spool, the urging force of the first urging member is adjusted so that it becomes weaker than the urging force of the second urging member. In this way, it is possible to securely separate the brake element from the shifting members by using the urging force of the second urging member. As a result, the braking force is not applied to the spool and the spool surely rotate freely.

In a third aspect of the present invention, the centrifugal braking device for a dual-bearing reel is a device in accordance with the either of the first and second aspects, but further wherein the shifting members are moved in the axial direction by the centrifugal force to press the brake element towards the axial direction. In this case, although it is necessary to think out a structure for attaching the shifting members since the shifting members are to be moved in the axial direction by using the centrifugal force which exerts in the radius direction, any structures in which the brake element makes contact with the shifting members which are moved in the axial direction may be acceptable. Accordingly, the structure of the brake element may be simplified.

The dual-bearing reel centrifugal braking device in a fourth aspect is a device according to the third aspect, yet further wherein each of the shifting members is attached to a respective guide shaft having an end portion inclined towards the brake element in a movable manner in an axial direction of the guide shaft. The guide shafts are radially attached to the spool or the rotary member, and each of the shifting members has a contacting portion at its end, which is parallel to a plane crossing a rotary axis of the spool at right angle. In this case, since the guide shafts are disposed radially in a slant manner, the shifting members move towards the brake element outwardly in the axial direction and the radius direction along the guide shaft in a slant manner when the centrifugal force acts on the shifting members, and make contact with the brake element at the contacting portion. Since the contacting portion is formed parallel to a plane crossing a rotary axis of the spool at right angle, the brake element may be made of a disc shaped member which crosses the rotary axis of the spool at right angle. For this reason, a structure for attaching the shifting members may be simplified as it is only necessary to construct so that the shifting members can move along the guide shaft. Also, the structure of the brake element may be simplified since a disc shaped member may be used as the brake element.

In a fifth aspect of the invention, the centrifugal braking device for a dual-bearing reel is a device in accordance with the either of the first and second aspects, but further wherein the shifting members are moved in the radius direction of the spool by centrifugal force, and the brake element is pressed towards the axial direction when the shifting members make contact with the brake element. In this centrifugal braking device, although a structure is required for the brake element, which is capable of converting a pressing force of the shifting members that are moved in the radius direction by centrifugal force to a force in the axial direction, the structure for attaching the shifting members may be simplified as the shifting members may be moved in the radius direction by using the centrifugal force.

The dual-bearing reel centrifugal braking device according to a sixth aspect is a device as set forth in the foregoing first aspect of the present invention, yet further wherein each of the shifting members includes a first member non-rotatably provided on the spool or the rotary member in a movable manner in the axial direction, the first member being capable of making contact with the brake element, a second member provided on the first member in a movable manner in the radius direction, the second member, when moved in the radius direction, being capable of moving the first member towards the brake element side, and a third urging member urging the first member in a direction away from the brake element. In this centrifugal braking device, when the spool rotates and the force in the axial direction applied to the second member by the centrifugal force becomes stronger than the urging force of the third urging member, the second member is moved outwardly in the radius direction and this movement of the second member in the radius direction causes the first member to move towards the brake element side to make contact with the brake element. As a result, the spool is braked. Also, when the force in the axial direction by the centrifugal force becomes weaker than the urging force of the second urging member, the second member is moved inwardly in the axial direction and the brake of the spool is released. In this device, the application of the braking force may be selectively carried out so that, for instance, the braking force is not applied during a line reeling-in operation when the spool is rotated at a low speed and is applied during a casting operation when the spool is rotated at a high speed by adjusting the urging force of the third urging member.

The dual-bearing reel centrifugal braking device according to a seventh aspect is a device as set forth in the foregoing first aspect of the present invention, yet further wherein each of the shifting members includes a first member non-rotatably provided on the spool or the rotary member in a movable manner in the axial direction, a second member provided on the first member in a movable manner in the radius direction, the second member, after being moved in the radius direction, being moved together with the first member in the axial direction to make contact with the brake element; and a third urging member urging the first member in a direction away from the brake element. In this centrifugal braking device, when the spool rotates and the force in the axial direction applied to the second member by the centrifugal force becomes stronger than the urging force of the third urging member, the second member is moved outwardly in the radius direction and this movement of the second member in the radius direction causes the first member to move towards the brake element side and the second member makes contact with the brake element. As a result, the spool is braked. Also, when the force in the axial direction by the centrifugal force becomes weaker than the urging force of the second urging member, the second member is moved inwardly in the axial direction and the brake of the spool is released. In this device, the application of the braking force may be selectively carried out so that, for instance, the braking force is not applied during a line reeling-in operation when the spool is rotated at a low speed and is applied during a casting operation when the spool is rotated at a high speed by adjusting the urging force of the third urging member.

In an eighth aspect of the invention, the centrifugal braking device for a dual-bearing reel is a device in accordance with any of the foregoing aspects, but further wherein the first urging member includes a plurality of coil springs having a different free length and a diameter, each of the plurality being disposed so as to be concentric to each other. In this centrifugal braking device, since the brake element makes contact with each of the coil springs of the first urging member stepwise, the urging force is changed stepwise, not continuously, and, accordingly, the braking force is varied stepwise. For this reason, a distinctive difference in the braking force may be obtained by the adjustment of the urging force.

DETAILED DESCRIPTION OF THE PREFERRED EMBODIMENTS

Embodiments
Overall Structure

Figure 1:
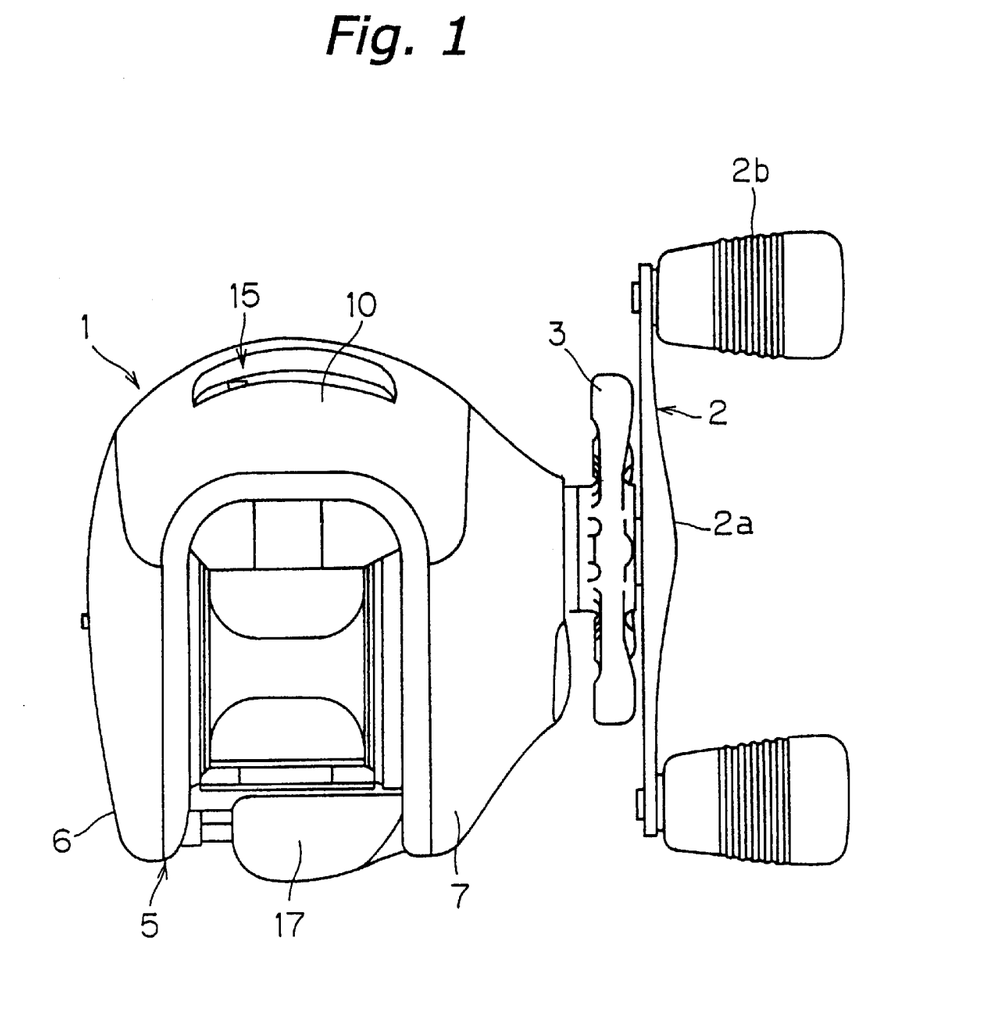
FIG. 1 is a plan view of a dual-bearing reel in which an embodiment of the present invention is adapted.

Reference is made to FIG. 1, the plan view of a dual-bearing reel in which an embodiment according to the present invention is adapted.

The dual-bearing reel shown in the figure is a bait reel used mainly for lure fishing and includes a reel body 1, a handle 2, and a star drag 3. The handle 2 is provided for rotating the spool and is disposed on one side of the reel body 1. The star drag 3 is disposed on the reel-body side of the handle 2. The handle 2 is a dual-handle type that includes a plate-type arm portion 2a and holding portions 2b, each of which is rotatably fitted to a respective end of the arm portion 2a. The outer surface of the arm portion 2a of the handle 2 is a smooth seamless surface to keep fishing line from getting tangled on it.

Figure 2:
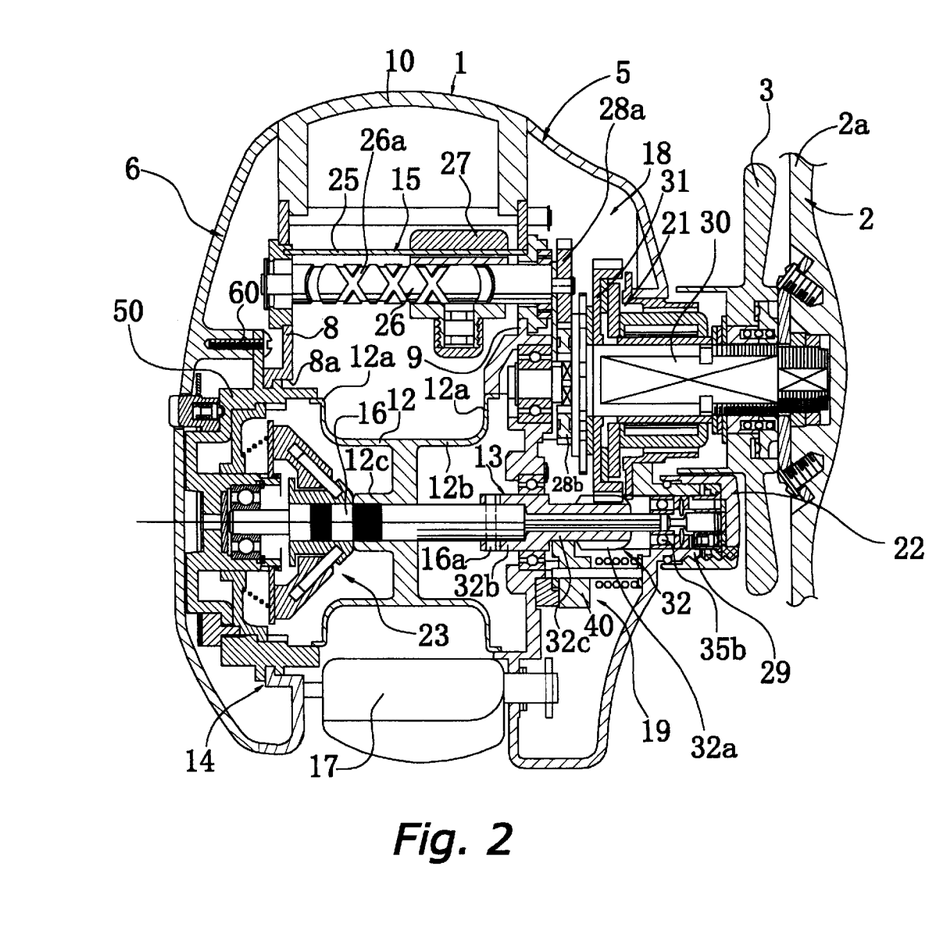
FIG. 2 is a sectional view through the reel of FIG. 1.

As shown in FIG. 2, the reel body 1 includes a frame 5, a first side-cover 6, a second side-cover 7, and a front cover 10. The first side cover 6 and the second side cover 7 are disposed on respective sides of the reel frame 5. The front cover 10 is disposed to be open/closable on a front portion of the frame 5. The frame 5 includes a pair of side plates 8 and 9, which are disposed opposite each other at a predetermined spacing, and a plurality of (not shown) connecting members, each of which connects the side plates 8 and 9.

The second side cover 7, which is located on the handle 2 end, is detachably fastened to the side plate 9 by screws.

The first side cover 6, which is located on the opposite end of the handle 2, is detachably fitted to the side plate 8 by a bayonet coupling 14. An opening 8a, through which the spool 12 penetrates, is formed in the side plate 8 located on the opposite end of the handle 2.

Inside the frame 5, are the spool 12, a level wind mechanism 15, and a thumb rest 17. The level wind mechanism 15 is provided for uniformly winding on fishing line around the spool 12. The thumb rest 17 on which the thumb is rested during a thumb-actuated operation is also used as a clutch lever. A gear mechanism 18, a clutch mechanism 13, a clutch engage/disengage mechanism 19, a drag mechanism 21, and a casting control mechanism 22 are provided in the space between the frame 5 and the second side-cover 7. The gear mechanism 18 transmits rotational force from the handle 2 to the spool 12 and the level wind mechanism 15. The clutch engage/disengage mechanism 19 engages/disengages the clutch mechanism 13 in accordance with operation of the thumb rest 17. The drag mechanism 21 brakes the spool 12 when fishing line is released. The casting control mechanism 22 brakes the spool 12 by grasping the spool's spindle 16 at either end. Also, a centrifugal braking mechanism 23 for preventing backlash during casting is provided between the frame 5 and the first side-cover 6.

The spool 12 on either side has saucer-shaped flange portions 12a, and between the flange portions 12a has tubular line-winding trunk 12b. Also, the spool 12 has a tubular boss portion 12c that is formed integral with the inner peripheral side of the line-winding trunk 12b in the middle. By for example, a serration engagement the spool 12 is non-rotatably fixed to the spool spindle 16, which penetrates through the boss portion 12c.

The spool spindle 16 penetrates the side plate 9 and extends outside the second side-cover 7. The extended end of the spool spindle 16 is rotatably supported on a bearing 35b in a boss 29 that is formed in the second side cover 7. Also, bearing 35a in the centrifugal braking mechanism 23 rotatably supports the other end of the spool spindle 16.

The level wind mechanism 15 includes a guide tube 25, a worm shaft 26, and a line guide 27. The guide tube 25 is fixed between the pair of side plates 8 and 9. The worm shaft 26 is rotatably supported in the guide tube 25. A gear 28a, which forms a part of the gear mechanism 18, is fixed to one end of the worm shaft 26. Also, a spiral groove 26a is formed on the worm shaft 26, and the line guide 27 is meshed with the spiral groove 26a. The line guide 27 therefore reciprocates along the guide tube 25 by the worm shaft 26 being rotated via the gear mechanism 18. A fishing line is inserted in the line guide 27 and uniformly wound onto the spool 12.

The gear mechanism 18 includes a main gear 31, a pinion gear 32, the above-mentioned gear 28a, and a gear 28b. The main gear 31 is coupled to a handle shaft 30. The pinion gear 32 is cylindrical and is engaged with the main gear 31. The gear 28a is fixed to one end of the worm shaft 26. The gear 28b is non-rotatably fixed to the handle shaft 30 and engaged with the gear 28a.

The pinion gear 32, a cylindrical member disposed outward of the side plate 9, is centrally penetrated by the spool spindle 16. The pinion gear 32 is fitted to be axially shiftable on the spool spindle 16. The pinion gear 32 includes a toothed portion 32a and an meshing portion 32b. The toothed portion 32a is located on the right side of the reel body 1 shown in FIG. 2 and engages with the main gear 31. The meshing portion 32b is formed at the other of the pinion gear 32. A constricted portion 32c is established between the toothed portion 32a and the meshing portion 32b. The meshing portion 32b is constituted by a recessed groove formed on the end face of the pinion gear 32, and a clutch pin 16a, which radially penetrates the spool spindle 16, engages in the meshing portion 32b. Shifting the pinion gear 32 outward detaches the clutch pin 16a on the spool spindle 16 from the recessed groove in the meshing portion 32b, such that rotation from the handle shaft 30 is not transmitted to the spool 12. The clutch mechanism 13 is constituted by the recessed groove of the meshing portion 32b and the clutch pin 16a.

As shown in FIG. 2, the thumb rest 17 is disposed at the back of the spool 12 in the rear part between the pair of side plates 8 and 9. The thumb rest 17 is also used as a clutch operation lever. An oblong hole (not shown) is formed in the side plates 8 and 9 of the frame 5, and a clutch cam (not shown) that fixes the thumb rest 17 penetrates the oblong hole. Thus, the thumb rest 17 slides up and down along the oblong hole. The clutch engage/disengage mechanism 19 includes a clutch yoke 40. By turning movement of the thumb rest 17, the clutch engage/disengage mechanism 19 shifts the clutch yoke 40 parallel to the axis of the spool spindle 16. Further, when the handle shaft 30 is rotated in the line reeling-in direction, the clutch engage/disengage mechanism 19 shifts the clutch yoke 40 whereby the clutch mechanism 13 is automatically put on.

In the configuration thus, the pinion gear 32 is normally located at a clutch engaging position and the meshing portion 32b is engaged with the clutch pin 16a for the spool spindle 16 to achieve a clutch-on state. On the other hand, when the pinion gear 32 is moved outwardly by the clutch yoke 40, the meshing portion 32b is disengaged from th e clutch pin 16a to achieve a clutch-off state.

In the configuration thus, the pinion gear 32 is the usual state is situated in the inward clutch-engaging position wherein the meshing portion 32b is engaged with the clutch pin 16a in the spool spindle 16, which is the clutch-on state. On the other hand, when the clutch yoke 40 shifts the pinion gear 32 outward, engagement of the meshing portion 32b and the clutch pin 16a is released, which is the clutch-off state.

Centrifugal Braking Mechanism Configuration

Figure 3:
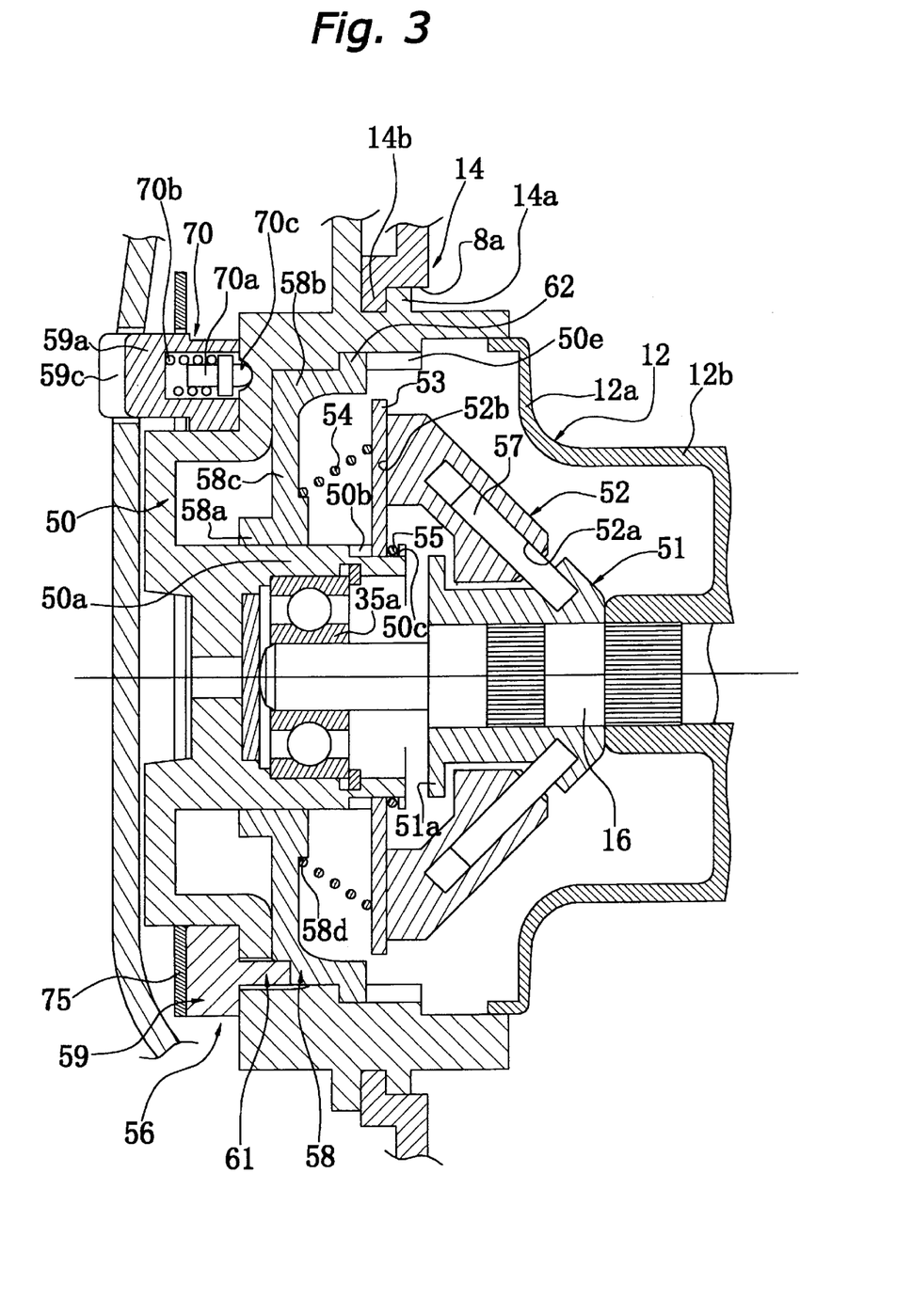
FIG. 3 is an enlarged fragmentary view of a centrifugal braking mechanism taken from FIG. 2.

As shown in FIG. 3, the centrifugal braking mechanism 23 includes shifting members 52, a brake element 53, an urging member 54, a restricting member 55, and an urging force adjusting mechanism 56. The shifting members 52 are provided on a rotary member 51 that rotates linked with the spool 12. The brake element 53 is capable of coming into contact with the shifting members 52. The urging member 54 urges the brake element 53 towards the shifting members 52. The restricting member 55 restricts travel of the brake element 53 towards the shifting members 52. The urging force adjusting mechanism 56 adjusts the urging force of the adjusting member 54.

The shifting members 52, members fitted to permit shifting on the rotary member 51, travel radially and axially outward under centrifugal force from rotation of the spool 12. The rotary member 51 is a cylindrical component non-rotatably coupled to the spool spindle 16 by, for instance, a serration coupling. Guide shafts 57, which may number six for example, are disposed circumferentially spaced on the outer peripheral surface of the rotary member 51. The radially fitted guide shafts 57 incline towards the brake element 53. Each shifting member 52 is provided in a respective guide shaft 57 and permitted axial travel therein. By thus disposing the guide shafts 57 radially, at an incline, the shifting members 52 shift diagonally-radially and axially outward—along the guide shafts 57 under centrifugal force, when centrifugal force acts on the shifting members 52. A flange portion 51a for preventing the shifting members 52 from coming off is disposed at an end (the left end in FIG. 3) of the rotary member 51.

The shifting members 52 are approximately rod-shaped components that bend towards the brake element 53. Guide holes 52a in which the guide shafts 57 are guided are formed in the shifting members 52. Contact surfaces 52b lying in a plane orthogonal to the spool spindle 16 are formed on the ends of the shifting members 52 on the brake element 53 side. The shifting members 52 are non-rotatable with respect to the guide shafts 57 in order that the contacting surfaces 52b stay lying in the just-mentioned orthogonal plane.

Figure 4:
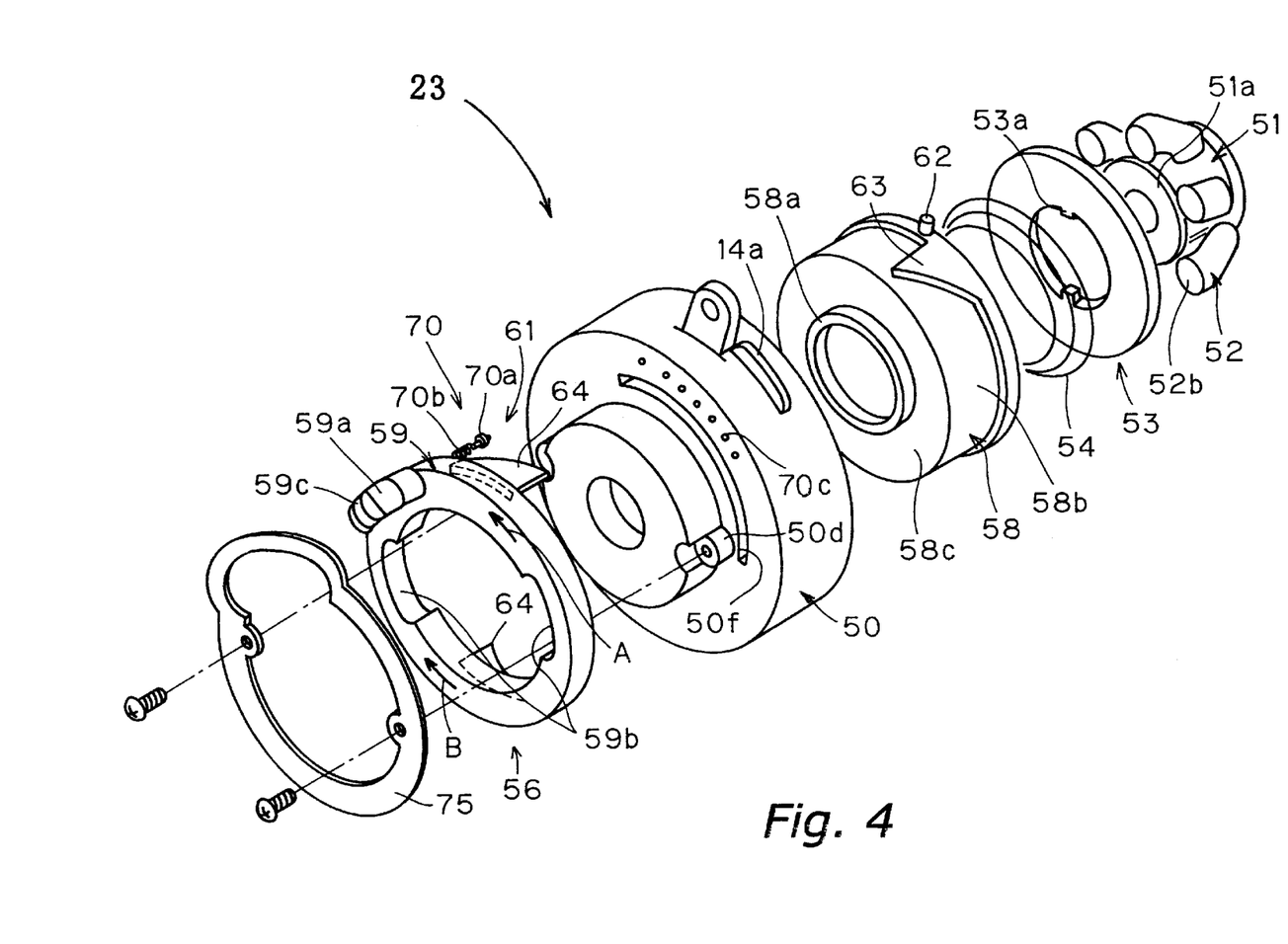
FIG. 4 is an exploded oblique view depicting components of the centrifugal braking mechanism.

As shown in FIGS. 3 and 4, the brake element 53 is provided non-rotatably on the reel body 1, yet allowed axial travel with respect to the spool 12. The brake element 53 is a washer-shaped component able to come into contact with the shifting members 52 shifted under centrifugal force. In practice, the brake element 53 is fitted non-rotatably yet permitted to shift axially in a brake case 50 that forms part of the reel body 1. The brake case 50, a short cylindrical component having base, is formed with a cylindrical bearing-accommodation portion 50a that projects inwardly from the central portion of the base. The inner periphery of the bearing accommodating portion 50a, to which a friction plate of the casting control mechanism 22 is attached, accommodates the bearing 35a that supports the spool spindle 16. The brake element 53 is non-rotatably fitted to and permitted axial travel on the outer periphery of the bearing accommodating portion 50a.

The brake case 50 (as shown in FIG. 2) is fixed to the first side cover 6 by a screw 60. Namely, the brake case 50 forms a part of the reel body 1. Also, a pair of mortise-grooves 50b are formed running axially on the outer periphery of the end (right end in FIG. 3) of the bearing accommodating portion 50a. The mortise-grooves 50b are provided for non-rotatably interlocking with the brake element 53. An annular groove 50c is formed at the end of the mortise-grooves 50b, and the restricting member 55 is fitted in the annular groove 50c. The restricting member 55 is, for example, an elastic ring-shaped element made of wire with a portion of the circle notched and, as described above, restricts travel of the brake element 53 towards the shifting members 52. Being that the inner periphery of the brake element 53 is supported on the bearing accommodating portion 50a to permit its axial shift, a pair of interlock projections 53a that interlock with the mortise-grooves 50b is formed on the inner periphery.

Three projections 14a that are components of the bayonet coupling 14 are formed circumferentially spaced on the outer surface of the brake case 50. Also, pawls 14b are formed on the opening 8a in positions opposite the projections 14a. The pawls are formed projecting 14b outwardly from the opening 8a.

The urging member 54 is a conical spring one end of which abuts on the brake element 53—the larger diameter end is on the brake element 53 side. The urging member 54 is disposed between the brake element 53 and a pressing member 58, which will be described later, in a compressed state. It should be understood that the urging member 54 may be at its free length when the pressing member 58 is most retracted.

The urging force adjusting mechanism 56 includes the pressing member 58, an operation member 59, and a cam mechanism 61. The pressing member 58 is disposed non-rotatably yet permitting axial shift in the brake case 50. The operation member 59 is pivotably fitted to the exterior of the brake case. The cam mechanism 61 converts pivoting of the operation member 59 into axial shifting of the pressing member 58.

The pressing member 58 includes an inner peripheral part 58a, an outer peripheral part 58b, and a base 58c. The inner peripheral part 58a is supported to permit axial shift on the bearing accommodating portion 50a. The outer peripheral part 58b is non-rotatably fitted yet permitted axial shift on inner surface of the brake case 50. The bottom portion 58c connects the inner peripheral part 58a and the outer peripheral part 58b. A pair of radially protruding interlock pins 62 is formed on the outer surface of the outer peripheral part 58b. The pair of interlock pins 62 interlocks with a pair of interlock grooves 50e formed in the inner peripheral surface of the brake case 50 along the spool spindle direction to fit the pressing member 58 non-rotatably to the brake case 50. Also, a first cam 63 of the cam mechanism 61 is formed on the outer peripheral surface of the outer peripheral part 58b. The first cam 63 is roughly triangular. A stepped portion 58d is formed on the inner wall of the bottom portion 58c, and the other end of the urging member 54 is interlocked on the stepped portion 58d.

The operation member 59, an approximately ring-shaped component, is rotatively fitted to the outer end face of the brake case 50. A knob 59a is formed on the outer periphery of the outer end face of the operation member 59. The knob 59a is formed protruding in the spool axial outward direction. A central projecting portion 59c running diametrically is further formed on the outer surface of the knob 59a so as to protrude from the surface of the first side cover 6. The projecting portion 59c for indicating a number from 0 to 5 (not depicted in the figures), for instance, on the surface of the first side cover 6 to signify braking force strength. Also, a pair of pivot-restricting recesses 59b for restricting pivotal range of the operation member is formed on the inner peripheral face thereof. A positioning mechanism 70 for positioning pivotal angle with respect to the brake case 50 into six positions is provided in the operation member 59.

The positioning mechanism 70 includes a positioning pin 70a, a coil spring 70b, and positioning recesses 70c. The positioning pin 70a is attached to the operation member 59 movably in the spool axis direction. The coil spring 70b urges the positioning pin 70a toward the brake case 50 side. The positioning recesses 73c, which number six in this embodiment, are formed circumferentially spaced on the outer lateral face of the brake case 50.

Second cams 64, which form a part of the cam mechanism 61, are provided on the right hand side surface of the operation member 59 in FIG. 4. Each of the second cams 64 is formed at a position corresponding to the position of the respective first cam 63, and forms a triangular oblique side cam. The rotation of the operation member 59 is converted into a movement of the pressing member 58 in a direction approaching to the brake element 53. Also, a pair of cam grooves 50f having an arc shape is provided in the brake case 50 for the respective second cam 64 to penetrate.

The operation member 59 is compressed against the brake case 50 by a pressing plate 75. The pressing plate 75 compresses the operation member 70 by means of screws, each of which is tighten against a respective screw base portion 50d formed on the outer side surface of the brake case 50. The screw base portion 50d protrudes outwardly in the radius direction. The range of the rotational angle of the operation member 59 is predetermined by the screw base portions 50d which stops the movement of the operation member 59 by being engaged with the respective rotation controlling concave portion 59b.

In the urging force adjusting mechanism 56 having the above-mentioned configuration, the pressing member 58 moves in a direction approaching the brake element 53 due to the function of the first and second cams 63 and 64 when the operation member 59 is rotated, using the knob portion 59a, in the direction indicate by an arrow A. As a result, the braking force is increased since the urging force against the brake element 53 is increased and the reaction force generated when the shifting members 52 make contact with the brake element 53 is increased. On the other hand, when the operation member 59 is rotated in the direction indicated by an arrow B, the pressing member 58 is moved in a direction away from the brake element 53 by the urging force of the urging member 54 and, hence, the urging force applied to the brake element 53 is reduced. Accordingly, the braking force is reduced. When the pressing member 58 is moved to a most receded position, the braking force reaches its minimal and the reaction force is gradually decreased from one position to the other among four intermediate positions. Accordingly, the braking force is decreased stepwise.

In this embodiment, since the braking force is adjusted by changing the urging force of the urging member 54, the braking force may be easily adjusted and a distinctive difference in the braking force may be obtained by the adjustment of the urging force.

Reel Operation

In a normal state, the clutch yoke 40 is pressed inwardly and, hence, a clutch-on state is maintained. As a result, the rotational force from the handle 2 is transmitted to the spool 12 via the handle shaft 30, the main gear 31, the pinion gear 32 and the spool spindle 16 to rotate the spool 12 in the line reeling-in direction. At that time, although centrifugal force acts on the shifting members 52 of the centrifugal braking mechanism 23 to move the shifting members 52 outwardly in the radius direction and the axial direction, the braking force does not become so large since the rotation speed of the spool 12 is low and, hence, it does not interfere with the rotation of the handle 2. However, if it is necessary to reduce the braking force, the operation member 59 may be rotated in the direction indicated by the arrow B in FIG. 4 using the knob portion 59a so that the pressing member may be positioned at a receded position shown in FIG. 3.

When a fishing line is cast, the braking force is adjusted to prevent backlash by the operation member 59 using the knob portion 59a. When the pressing member 58 is moved towards the brake element 53 by rotating the operation member 59 in the direction indicated by the arrow A, the urging force of the urging member 54 is increased and the braking force is enhanced.

Then, the thumb rest 17 may be pushed down. In this embodiment, the thumb rest 17 is moved along the side plates 8 and 9 down to a disengaging position located below. Due to the movement of the thumb rest 17, the clutch yoke 40 and the pinion gear 32 are moved outwardly. As a result, the clutch enters a clutch-off state. In the clutch-off state, the rotation from the handle shaft 30 is not transmitted to neither the spool 12 nor the spool spindle 16 and the spool 12 may freely rotate. When a fishing rod is swung in the clutch-off state so that a reel is inclined in the axis direction in order for the spool spindle 16 to face a vertical surface while thumbing the spool using a thumb on the thumb rest 17, a lure is cast and the spool 12 rotates vigorously in the line-releasing direction.

In this state, the spool spindle 16 is rotated in the line-releasing direction by the rotation of the spool 12, and the rotation is transmitted to the rotary member 51. When the rotary member 51 is rotated, the shifting members 52 make contact with the brake element 53, and the spool 12 is braked by the centrifugal braking mechanism 23 to prevent a generation of backlash.

In addition, if backlash of the spool 12 is caused by any chance, the problem may be easily dissolved since the first side cover 6 is easily removed due to the presence of the bayonet coupling 14.

Moreover, if the lure is changed to one having a different weight, the braking force may be adjusted in accordance with the weight of the lure, by rotating the operation member 59 using the knob portion 59a. In this embodiment, the braking force is easily adjusted by simply rotating the operation member 59 using the knob portion 59a which is exposed to outside of the reel. Further, a clear difference in the braking force may be obtained when the braking force is adjusted.

Other Embodiments (a) Although the pressing member 58 is shifted by the cam mechanism 61 in the above-described embodiment, the pressing member 58 may be shifted through other converting mechanisms such as screws.

Figure 5:
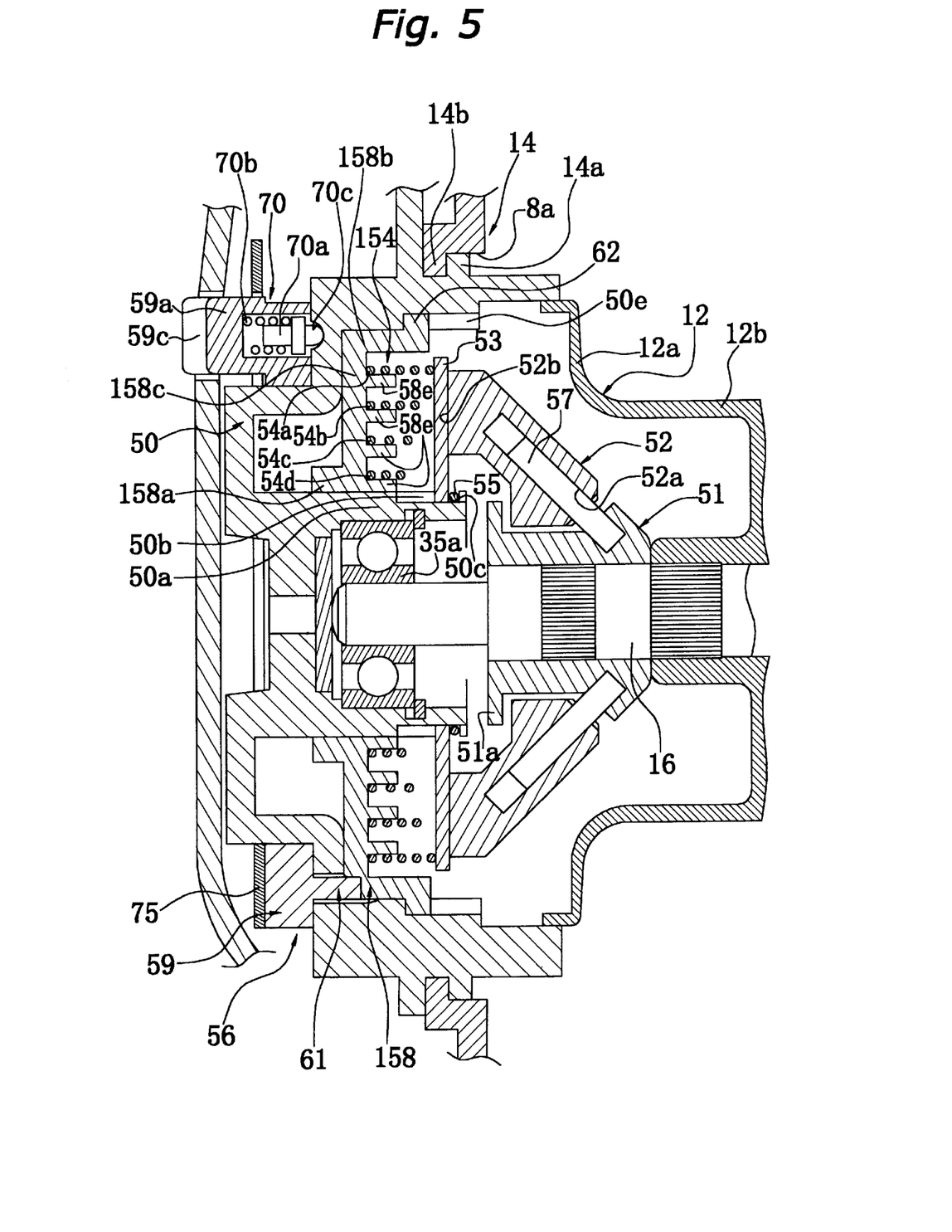
FIGS. 5, 6, 7, 8 and 9 are views of the centrifugal braking mechanism each corresponding to FIG. 3, in respective further embodiments of the present invention.

(b) The brake element 53 may be urged by an urging member 154 formed by a plurality of coil springs 54a through 54d, as shown in FIG. 5. In this embodiment, the coil springs 54a through 54d are each of different free length and diameter, and disposed concentrically nested. The free length of the coil spring 54a on the outer circumferential side is the longest and that of the coil spring 54d on the inner circumferential side is the shortest. Also, the position of the tip-end of the coil spring 54d on the inner circumferential side located to enable contact with the brake element 53 when most retracted. The pressing member 158 in this embodiment includes inner portion 158a, outer portion 158b, and base portion 158c. Cylindrical interlock projections 58e for interlocking with the base ends of the coil springs 54a through 54d are provided on the [pressing member 58] base portion 158c.

In this embodiment, since the brake element 53 makes contact with each coil spring 54a through 54d stepwise, the urging force changes stepwise, not continuously, and, hence, the braking force also varies stepwise. Accordingly, a distinctive difference in the braking force may be obtained by adjusting the urging force.

Figure 6:
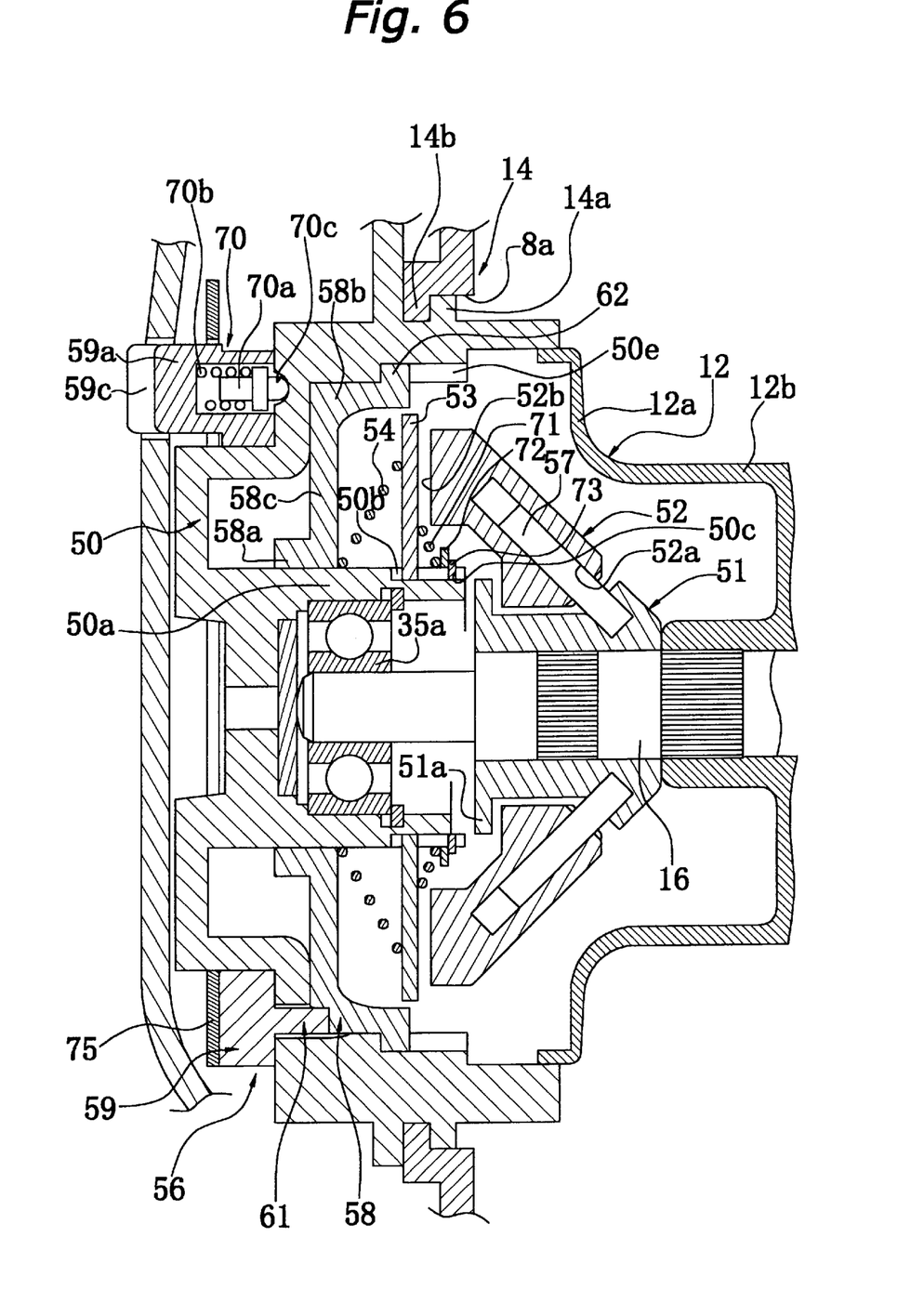

(c) As shown in FIG. 6, it is possible to dispose an urging member 71 at the right hand side of the brake element 53 in FIG. 6. The urging member 71 may be a cone shaped coil spring whose diameter becomes larger towards the brake element 53 side. The spring constant of the urging member 71 is smaller than that of the urging member 54 and the urging force at a normal state of the urging member 71 is also smaller than that of the urging member 54. An end portion of the urging member 71 at the smaller diameter side is engaged with a spring engaging ring 73 which is controlled by a stop ring 72 being engaged with the annular groove 50c. In this embodiment, the urging force of the urging member 54 is adjusted by using the urging force adjusting mechanism 56 so that it becomes stronger than the urging force of the urging member 71. When it is desired to freely rotate the spool 12, the urging force of the urging member 54 is adjusted so that it becomes weaker than the urging force of the urging member 71. In this manner, the brake element 53 may be surely separated from the shifting members 52 by the urging force of the urging member 71. As a result, the braking force is not applied to the spool 12 and, hence, the spool 12 may surely rotate in a free state.

Figure 7:
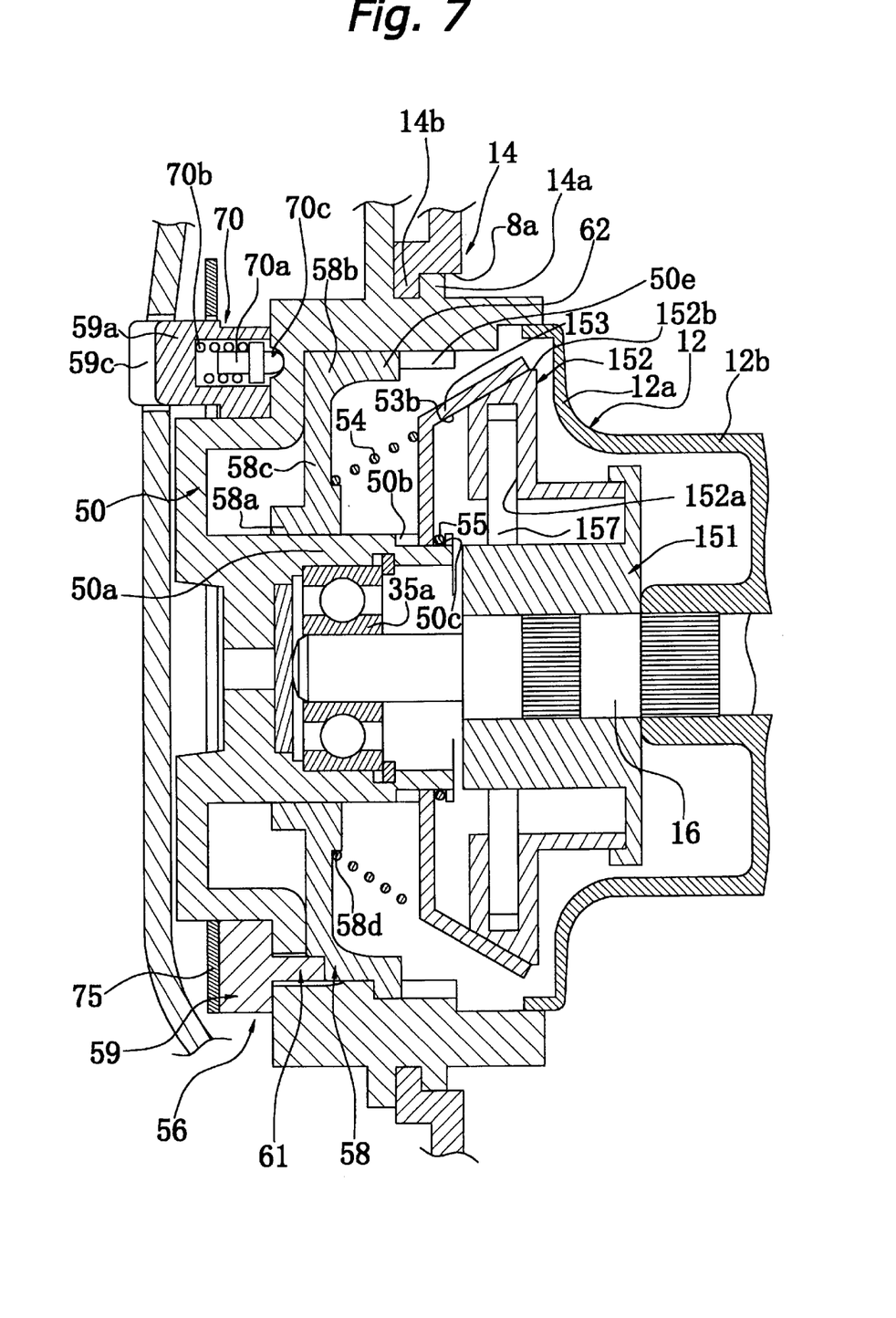

(d) As shown in FIG. 7, guide shafts 157 may be radially disposed in guide holes 152a extending along the radius direction of rotary member 151, and a conical inclined braking surface 53b may be formed on brake element 153. Herein, shifting members 152 are movably guided in the radius direction of the rotary member 51. Contact faces 152b formed with sloping bent surfaces so as to contact the braking face are formed on the ends of the shifting members 152. In the embodiment thus, when the spool 12 is rotated and centrifugal force acts on the shifting members 152, the shifting members 152 move outwardly in the radius direction to make contact with the inclined braking surface 53b. Accordingly, the spool 12 is braked. Therein, since the inclined braking surface 53b is inclined, the brake element 153 is pressed outwardly in the spool axis direction by the shifting members 152. The braking force in this instance is determined by the urging force of the urging member 54 urging the brake element 53 towards the shifting members 152. Herein, the structure for attaching the shifting members 152 is simplified because the shifting members 152 need only shift radially.

Figure 8:
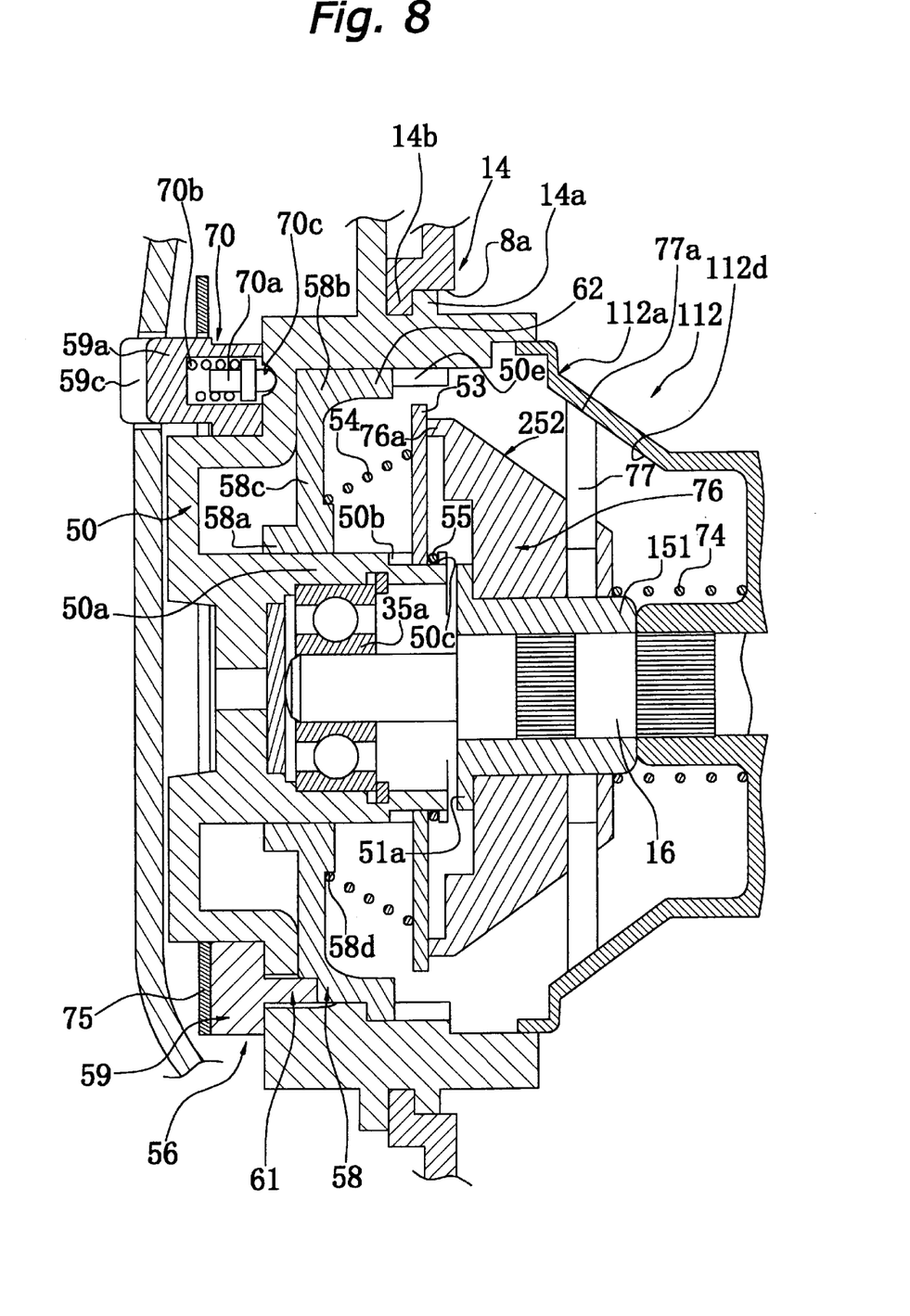

(e) As shown in FIG. 8, shifting members 252 may be configured with two elements, a first shifting member 76 allowed to shift axially, and a second shifting members 77 allowed to shift radially.

The first shifting member 76 is, for instance, a circular truncated conical member provided non-rotatably, yet permitted axial shift, on rotary member 151. An annular contact portion 76a is formed on the end of the first shifting member 76 on the large-diameter side. An extension member 74 made out of a coil spring interlocks with the other end on the small-diameter side. The extension member 74 pulls the first shifting member 76 towards spool 112. For this purpose, the ends of the extension member 74 are interlocked with the first shifting member 76 as well as the spool 112. It should be noted that the tensile force of the extension member 74 is weaker than, for example, the axially outward component force acting under centrifugal force on the first shifting member 76 when centrifugal force acts on the second shifting members 77 during line reel-out, and larger than the axially outward component force acting during the line reeling-in operation.

The second shifting members 77 are fitted to the first shifting member 76 allowing them to shift radially. The ends of the second shifting members 77 are faces 77a sloped for contact on a tapered surface 112d formed on the outer peripheral surface of the flange portion 112a of the spool 112.

In the embodiment thus, when the spool 112 rotates and centrifugal force acts on the second shifting members 77, the second shifting members 77 shift radially outward under the centrifugal force and contact the tapered surface 112d. When the second shifting members 77 come into contact with the tapered surface 112d, they shift axially outward together with the first shifting member 76 at the point when the axial component force arising due to the centrifugal force becomes larger than the tensile force of the extension member 74. As a result, the first shifting member 76 comes into contact with the brake element 53 to brake the spool. When the component force due to the centrifugal force becomes weaker than the tensile force the first shifting member 76 is pulled by the extension member 74 and parted from the brake element 53. Further, the spool 112 is not braked when rotated at the speeds during line reel-in that are lower than during line reel-out, because when reeling in line the component force that arises under centrifugal force is weaker than the tensile force of the extension member 74. The spool 112 is therefore selectively braked during line reel-in and during line reel-out.

Figure 9:
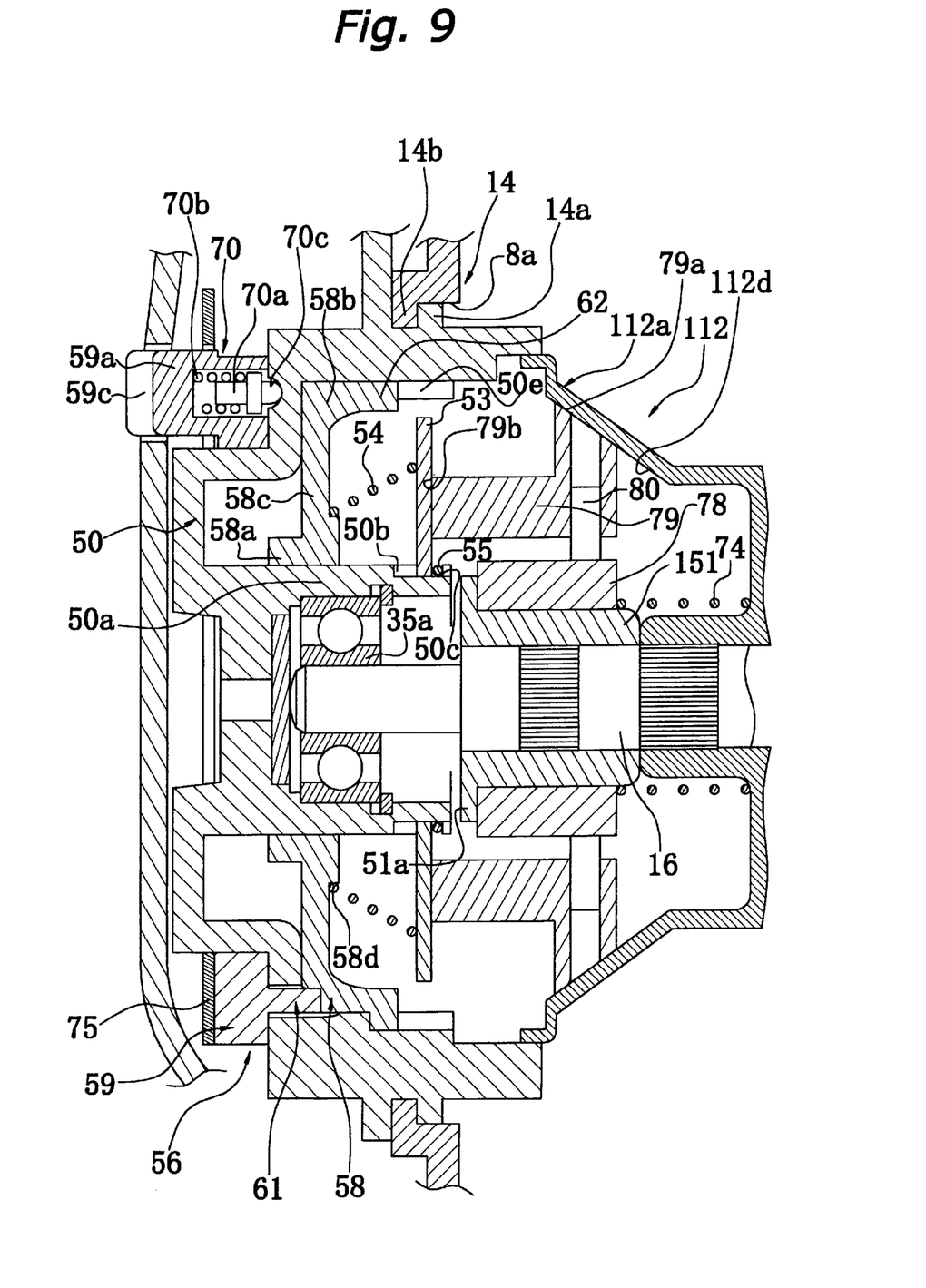

In addition, as shown in FIG. 9, guide shafts 80 may be provided radially on first shifting member 78 provided non-rotatably yet permitted axial shift on the rotary member 51. Second shifting members 79 permitted radial movement may be provided on the guide shafts 80. Formed on the second shifting members 79 are first contact surfaces 79a that come into contact with the tapered surface 112d of the spool 112, and second contact surfaces 79b that come into contact with the brake element 53. Operation in this case is likewise as with the embodiment illustrated in FIG. 8; explanation is therefore omitted.

(f) In the above embodiment, although the shifting members are provided on the rotary member in a movable manner in the radius direction and/or the axial direction, the shifting members may be pivotally provided on the rotary member so the they are pivoted by the centrifugal force.

(g) In the above embodiment, although the shifting members are provided on the rotary member which rotates together with the spool 12, the shifting members maybe directly attached to the spool 12.

According to the present invention, since the braking force is adjusted by changing the urging force of the first urging member, the braking force may be adjusted easily and a distinctive difference in the braking force may be obtained by the adjustment of the urging force.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. In a dual-bearing reel having a reel body wherein a spool is provided rotatively on an axle, a centrifugal braking device for braking the spool by centrifugal force, the dual-bearing reel centrifugal braking device comprising:

shifting members provided on one selected from the spool and a rotary member rotatingly linked with the spool, said shifting members shifting under centrifugal force due to rotation of said spool;

a brake element non-rotatably provided in the reel body yet permitted travel in the axial direction of said spool, said brake element for contact with said shifting members shifted under centrifugal force;

a first urging member for urging said brake element towards said shifting members;

a restricting member for regulating travel of said brake element towards said shifting members; and an urging force adjusting mechanism for adjusting urging force of said first urging member.

2. The dual-bearing reel centrifugal braking device set forth in claim 1, further comprising:

a second urging member for urging said brake element in a direction parting from said shifting members, wherein urging force of said second urging member is smaller than urging force of said first urging member.

3. The dual-bearing reel centrifugal braking device set forth in claim 2, wherein said shifting members include:

first member parts provided non-rotatably, yet permitted to shift axially, on said one selected from the spool and a rotary member rotatingly linked with the spool, said first member parts for contact with said brake element;

second member parts provided to permit radial shifting on said first member parts, wherein by radial travel said second member parts shift said first member parts towards said brake element; and a third urging member for urging said first member parts in a direction parting from said brake element.

4. The dual-bearing reel centrifugal braking device set forth in claim 2, wherein said shifting members include:

first member parts provided non-rotatably, yet permitted to shift axially, on said one selected from the spool and a rotary member rotatingly linked with the spool;

second member parts provided to permit radial shifting on said first member parts, wherein by radial travel said second member parts shift together with said first member parts in said axial direction into contact with said brake element; and a third urging member for urging said first member parts in a direction parting from said brake element.

5. The dual-bearing reel centrifugal braking device set forth in claim 1, wherein said shifting members shifting under centrifugal force in the axial direction of said spool press on said brake element in said axial direction.

6. The dual-bearing reel centrifugal braking device set forth in claim 5, wherein:

said shifting members are fitted to guide shafts provided standing radially on said one selected from the spool and a rotary member rotatingly linked with the spool, and incline endwise toward said brake element; and said shifting members endwise have contact portions lying in a plane orthogonal to the axial direction of said spool.

7. The dual-bearing reel centrifugal braking device set forth in claim 1, wherein:

said shifting members shift radially of said spool under centrifugal force; and said brake element is pressed in said axial direction when said shifting members come into contact therewith.

8. The dual-bearing reel centrifugal braking device set forth in claim 1, wherein said first urging member includes a plurality of nested concentric coil springs differing in free length and coil diameter.

9. In a dual-bearing fishing reel having a line-winding spool spinning on a spindle clutch-engagable to and disengagable from a line-winding handle in one bearing end of the reel, a centrifugal braking device for selectively braking the spool, the centrifugal braking device comprising:

a rotary member mechanically linked to the spool for rotation together therewith;

a centrifugally shifting member supported on said rotary member in a configuration enabling said shifting member, under centrifugal force of the spool when spinning, to shift along a direction having axial and radial components with respect to said rotary member, said shifting member therein being provided with axial and radial braking contact faces intersecting said axial and radial components;

a brake disk fitted non-rotatably to and permitted axial travel on a bearing-accommodating portion of a brake case accommodating the other bearing-end of the reel, for axial braking contact with the axial braking contact face of said shifting member;

a radial braking surface configured for radial braking contact with the radial braking contact face of said shifting member;

a compressive urging member for urging said brake disk towards said axial braking contact face of said shifting member;

an extensive urging member interlocked endwise with said shifting member to draw said shifting member towards the spool;

a regulating element for regulating axial travel of said brake element towards said shifting members; and an urging force adjusting mechanism for adjusting urging force of said compressive urging member on said brake disk; wherein tensile force of said extensive urging member is predetermined to be smaller than the axial component of centrifugal force acting on said shifting member when the spool is spinning clutch-disengaged from the handle, and to be to be larger than the axial component of centrifugal force acting on said shifting member when the spool is spinning clutch-engaged to the handle.

\* \* \* \* \*